(12) United States Patent
Mohan

(10) Patent No.: US 11,106,627 B2
(45) Date of Patent: Aug. 31, 2021

(54) FRONT-END VALIDATION OF DATA FILES REQUIRING PROCESSING BY MULTIPLE COMPUTING SYSTEMS

(71) Applicant: BANK OF AMERICA CORPORATION, Charlotte, NC (US)

(72) Inventor: Mahesh Chandra Mohan, Livia (SG)

(73) Assignee: BANK OF AMERICA CORPORATION, Charlotte, NC (US)

(*) Notice: Subject to any disclaimer, the term of this patent is extended or adjusted under 35 U.S.C. 154(b) by 533 days.

(21) Appl. No.: 16/025,299

(22) Filed: Jul. 2, 2018

(65) Prior Publication Data

US 2020/0004837 A1    Jan. 2, 2020

(51) Int. Cl.
*G06F 16/11*    (2019.01)
*G06F 16/23*    (2019.01)

(52) U.S. Cl.
CPC .......... *G06F 16/116* (2019.01); *G06F 16/122* (2019.01); *G06F 16/2365* (2019.01)

(58) Field of Classification Search
None
See application file for complete search history.

(56) References Cited

U.S. PATENT DOCUMENTS

| | | | |
|---|---|---|---|
| 5,715,397 A | 2/1998 | Ogawa et al. | |
| 5,802,312 A | 9/1998 | Lazaridis et al. | |
| 6,065,119 A | 5/2000 | Sandford, II et al. | |
| 7,010,582 B1 | 3/2006 | Cheng et al. | |
| 7,069,594 B1 | 6/2006 | Bolin | |
| 7,197,480 B1 | 3/2007 | Chollon et al. | |
| 8,204,824 B2 | 6/2012 | Knowles et al. | |
| 8,418,142 B2 | 4/2013 | Ao et al. | |
| 9,799,026 B1 | 10/2017 | Allen et al. | |
| 2002/0147726 A1 | 10/2002 | Yehia et al. | |
| 2003/0149742 A1* | 8/2003 | Bollerud | G06F 16/18 |
| 2004/0189708 A1 | 9/2004 | Larcheveque et al. | |
| 2004/0260968 A1 | 12/2004 | Edwards et al. | |
| 2005/0114338 A1 | 5/2005 | Borthakur et al. | |
| 2005/0197946 A1 | 9/2005 | Williams et al. | |
| 2011/0093390 A1* | 4/2011 | Tischer | G06F 16/901 |
| 2011/0138064 A1* | 6/2011 | Rieger | G06F 16/9577 |
| | | | 707/715 |
| 2011/0282969 A1 | 11/2011 | Iyer et al. | |

(Continued)

*Primary Examiner* — Son T Hoang
(74) *Attorney, Agent, or Firm* — Michael A. Springs; Moore & Van Allen PLLC; James C. Edwards

(57) ABSTRACT

A system, method and the like for front-end comprehensive validation of data files that require processing by multiple different computing systems having different validation requirements. Validation for all of the multiple different computing systems is performed upon receipt of the data file by the data processing entity and, as such, in the event that validation results in an error/failure, the originator/sender of the data file can be notified of the error failure proximate in time to when the data file is transmitted to the data processing entity and can re-submit a valid data file in due time. In addition, the present invention is configured to insure that the validation meets the current requirements of all the computing systems that process the data file by employing a centralized data file validation requirements database that stores validation requirements for each of the computing systems.

11 Claims, 5 Drawing Sheets

(56) References Cited

U.S. PATENT DOCUMENTS

| | | |
|---|---|---|
| 2012/0030556 A1* | 2/2012 | Cohen .................. G06F 16/957 |
| 2013/0204775 A1 | 8/2013 | Midkiff et al. |
| 2015/0269212 A1* | 9/2015 | Kramer ............... G06F 16/2358 |
| | | 707/687 |
| 2015/0347989 A1 | 12/2015 | Kumar S et al. |
| 2016/0180303 A1 | 6/2016 | Neece et al. |
| 2016/0253639 A1 | 9/2016 | Sharma |
| 2017/0024738 A1 | 1/2017 | Vaidyanathan |
| 2018/0373711 A1* | 12/2018 | Ghatage .............. G06F 16/1748 |

\* cited by examiner

FRONT-END VALIDATION OF DATA FILES REQUIRING PROCESSING BY MULTIPLE COMPUTING SYSTEMS

FIELD OF THE INVENTION

The present invention is generally directed to computer data processing and, more specifically, performing front-end comprehensive validation of data files that require processing by multiple different computing systems having different validation requirements.

BACKGROUND

In many enterprises, data files are received that require processing by multiple different computing systems in a sequential order. Each of the different computing systems typically implements a validation process before the data is processed. The validation process may provide for verifying that the data is formatted properly (e.g., file type, file naming convention, file configuration and the like). In additional instances, the validation process may involve verifying that data entries exist and are formatted properly for data fields that are deemed to be mandatory (i.e., essential for the data processing associated with the computing system).

Since the data may be processed in sequence or in parallel by the various multiple computing systems and the validation occurs at the computing system prior to initiating the processing, efficiency-related problems arise when a data file fails a validation process at a downstream computing system. For example, a data file may pass validation for the first computing system and, as a result, undergo processing by the first computing system. However, when the data file is submitted to the second computing system (or any subsequent computing system in the processing chain) and the validation process for the second computing system results in errors/validation failure, the originator/sender of the data file is notified of the validation failure and required to re-submit the data file in a valid format and/or with valid data entries. Since large data files may take days for the completion of the overall data processing operation, incurring a validation error/failure midway through the process is detrimental to both the data processing entity and the originator/sender of the data file. From the data processing entity perspective, if the validation error/failure occurs at a later stage of the data processing operation prompting the need for the sender to resubmit a properly formatted data file, the resubmitted data file may be required to be processed by the initial computing systems, which the previously submitted data file had already successfully undergone. In other words, inefficient redundant data processing results. From the originator/sender perspective, the originator/sender has an expectation as to timeframe for completing the overall data processing operation and receiving a result. In the event that a validation error/failure occurs at a later stage of the data processing operation prompting the need for the sender to resubmit a properly formatted data file, significant delay will likely occur in the time required to complete the overall data processing operation.

While such formatting errors/failures may occur due to human error (i.e., incorrect data entry or formatting) on behalf of the originator/sender, in other instances formatting errors/failures occur due to the fact that the originator/sender is unaware of technical changes that have occurred at the data processing entity-level, which dictated changes to the data file validation requirements (e.g., a file format requirement and/or data entry requirement may change).

Therefore, a need exists to prevent the occurrence of data files being flagged/rejected for validation errors at later stage of a multiple computing system data processing operation. In this regard, a need exists to insure that data files are valid for all of the computing systems that will process the data file at the onset (i.e., upon receipt) of the data file by the data processing entity. Further, a need exists to be able to provide the originator/sender of the data file immediate notification (i.e., shortly after submission) in the event that the data file is determined to not meet validation requirements for any one of the multiple computing systems that are required to process the data file.

BRIEF SUMMARY

The following presents a summary of certain embodiments of the invention. This summary is not intended to identify key or critical elements of all embodiments nor delineate the scope of any or all embodiments. Its sole purpose is to present certain concepts and elements of one or more embodiments in a summary form as a prelude to the more detailed description that follows.

Embodiments of the present invention address the above needs and/or achieve other advantages by providing systems, methods, computer program product and/or the like for front-end comprehensive validation of data files that require processing by multiple different computing systems having different validation requirements. In this regard, the validation for all of the multiple different computing systems is performed upon receipt of the data file by the data processing entity. As such, in the event that validation results in an error/failure, the originator/sender of the data file can be notified of the error failure proximate in time to when the data file is transmitted to the data processing entity and can re-submit a valid data file in due time.

In specific embodiments of the invention, validation includes verifying the correctness of file format (e.g., file naming convention, file type, file configuration/structure and the like). While in other embodiments, validation may include determining that valid data entries exist in mandatory data fields (i.e., mandatory data that is required for processing the data is included in the file) or, in other embodiments, all of the data entries may be validated.

In addition, the present invention is able to insure that the validation meets the current requirements of all the computing systems that process the data file. In this regard, the present invention employs a centralized data file validation requirements database that stores validation requirements for each of the computing systems. Validation occurs by comparing validation attributes of the data file to the validation requirements of the requisite computing stores as stored in the database. The database is in active communication with the computing systems, such that, changes to the computing systems that result in changes to the validation requirements may be immediately stored in the database.

A system for front-end validation of a data file requiring processing by a plurality of computing systems defines first embodiments of the invention. The system includes a first computing platform disposed in a distributed computing network and including a first memory and at least one first processor in communication with the memory. A centralized data file validation requirements database is stored in the first memory, accessible by the at least one first processor and configured to store one or more data file validation requirements for each of a plurality of downstream computing systems.

The system additionally includes a second computing platform disposed in the distributed computing network and including a second memory and at least one second processor in communication with the memory. A data file validation application is stored in the second memory and executable by the at least one second processor. The application is configured to, in response to receiving a data file, identify (i) two or more of the downstream computing systems that will process the data file, and (ii) one or more file format attributes. The application is further configured to access the centralized data file validation requirements database to retrieve data file validation requirements for the two or more of the downstream computing systems, and, validate that the file format of the data file complies with the data file validation requirements of the two or more of the downstream computing systems by comparing the file format attribute(s) to the retrieved data file validation requirements. The application is further configured to, in response to validating, authorize the data file for processing by the two or more of the downstream computing systems.

In specific embodiments of the system, the data file validation application is further configured to, in response to receiving the data file, scan the data file to identify data entries in predetermined data fields, and validate that the data entries comply with the data file validation requirements of the two or more of the downstream computing systems. In specific embodiments of the system, the predetermined data fields are mandatory data fields required for performing processing by the two or more of the downstream computing systems. In other related embodiments of the system, the data file validation application is further configured to, in response to receiving the data file, scan the data file to identify all data entries in the data file, and validate that all of the data entries comply with the data file validation requirements of the two or more of the downstream computing systems.

In other specific embodiments of the system, the centralized data file validation requirements database is in active communication with a plurality of the downstream computing systems. Based on the active communication, changes made to one of the plurality downstream computing systems that affect formatting, are reflected in a real-time update to a corresponding one of the data file validation requirements stored in the centralized data file validation requirements database.

In further specific embodiments of the system, the data file validation application is further configured to validate by performing pattern matching of the file formatting attribute(s) to the data file validation requirements of the two or more of the downstream computing systems. In such embodiments of the system, pattern matching may include verifying that common file format attributes associated with the two or more of the downstream computing systems match the data file validation requirements and, if the common file format attributes match, verifying one or more unique file format attributes for at least one of the two or more of the downstream computing systems match the data file validation requirements.

In further specific embodiments the system includes a third computing platform disposed in a distributed computing network and including a third memory and at least one third processor in communication with the memory. A plurality of data file entry applications are stored in the third memory, executable by the third processor and configured to provide user interfaces for inputting the data file and initiating communication of the data file to the data file validation application. In related embodiments of the system, the data file validation application is further configured to (i) in response to failing to validate the file format of the data file, communicate, via one of the data file entry applications used to initiate communication of the data file, a real-time notification that is configured to indicate expected formatting requirements and a need to re-submit the data file that meets the expected formatting requirements and (ii) in response to validating the file format of the data file, communicate, via one of the data file entry applications used to initiate communication of the data file, a real-time notification that is configured to indicate that the data file has been validated and that data processing by the computing systems is ensuing.

A computer-implemented method for front-end validation of a data file requiring processing by a plurality of computing systems defines second embodiments of the invention. The method is executed by a computing device processor. The method includes, in response to receiving a data file, identifying (i) two or more of the downstream computing systems that will process the data file, and (ii) one or more file format attributes. Additionally the method includes accessing a centralized data file validation requirements database to retrieve file validation requirements for the two or more of the downstream computing systems and validating that the file format of the data file complies with the data file validation requirements of the two or more of the downstream computing systems by comparing the file format attributes to the validation requirements. In addition, the method includes, in response to validating, authorizing the data file for processing by the two or more of the downstream computing systems.

In specific embodiments the computer-implemented method further includes, in response to receiving the data file, scanning the data file to identify data entries in predetermined data fields, and validating that the data entries comply with the data file validation requirements of the two or more of the downstream computing systems. In such embodiments of the invention the predetermined data fields are one of (i) mandatory data fields required for performing processing by the two or more of the downstream computing systems, or (ii) all of the data fields having data entries in the data file.

In further specific embodiments of the computer-implemented method, validating further includes performing pattern matching of file format attributes to the data file validation requirements of the two or more of the downstream computing systems. In such embodiments of the computer-implemented method performing pattern matching may include verifying that common format attributes associated with the two or more of the downstream computing systems match the data file, and, in response to verifying that the common format attributes do match the data file validation requirements, verifying one or more unique file format attribute for at least one of the two or more of the downstream computing systems match the data file validation requirements.

In other specific embodiments the method includes, in response to failing to validate the file format of the data file, communicating to the entity transmitting the data file a real-time notification that is configured to indicate expected formatting requirements and a need to re-submit the data file that meets the expected formatting requirements. In other specific embodiments the method includes, in response to validating the file format of the data file and/or other validation attributes, communicating to the entity transmitting the data file a real-time notification that is configured to indicate that the file has been validated and that processing by the computing systems is ensuing.

A computer program product including a non-transitory computer-readable medium defines third embodiments of the invention. The computer-readable medium includes a first set of codes for causing a computer to, in response to receiving a data file, identify (i) two or more of the downstream computing systems that will process the data file, and (ii) one or more file format attributes. The computer-readable medium additionally includes a second set of codes for causing a computer to access a centralized data file validation requirements database to retrieve file validation requirements for the two or more of the downstream computing systems. In addition, the computer-readable medium includes a third set of codes for causing a computer to validate that the file format of the data file complies with the data file validation requirements of the two or more of the downstream computing systems by comparing the file format attributes to the data file validation requirements. Moreover, the computer-readable medium includes a fourth set of codes for causing a computer to, in response to validating, authorize the data file for processing by the two or more of the downstream computing systems.

In specific embodiments of the computer program product, the first set of codes is further configured to cause the computer to scan the data file to identify data entries in predetermined data fields; and the third set of codes ifs further configured to validate that the data entries comply with the data file validation requirements of the two or more of the downstream computing systems. In such embodiments of the computer program product, the predetermined data fields are one of (i) mandatory data fields required for performing processing by the two or more of the downstream computing systems, or (ii) all of the data fields having data entries in the data file.

In further specific embodiments of the computer program product, the third set of codes is further configured to cause the computer to validate y performing pattern matching of formatting attributes based on the data file validation requirements of the two or more of the downstream computing systems. In such embodiments of the computer program product, pattern matching may include verifying that common format attributes associated with the two or more of the downstream computing systems match the data file, and, in response to determining that the common format attributes do match the data file, verifying one or more unique format attributes for at least one of the two or more of the downstream computing systems match the data file.

In still further specific embodiments the computer-readable medium of the computer program product includes a fifth set of codes for causing a computer to, (i) in response to failing to validate the file format of the data file, communicate to the entity transmitting the data file a real-time notification that is configured to indicate expected formatting requirements and a need to re-submit the data file that meets the expected formatting requirements and (ii) in response to validating the file format of the data file, communicate to the entity transmitting the data file a real-time notification that is configured to indicate that the data file has been validated and that processing by the computing systems is ensuing.

Thus, according to embodiments of the invention, which will be discussed in greater detail below, the present invention provides for front-end comprehensive validation of data files that require processing by multiple different computing systems having different validation requirements. Validation for all of the multiple different computing systems is performed upon receipt of the data file by the data processing entity and, as such, in the event that validation results in an error/failure, the originator/sender of the data file can be notified of the error failure proximate in time to when the data file is transmitted to the data processing entity and can re-submit a valid data file in due time. In addition, the present invention is configured to insure that the validation meets the current requirements of all the computing systems that process the data file by employing a centralized data file validation requirements database that stores validation requirements for each of the computing systems. The database is in active communication with the computing systems, such that, changes to the computing systems that result in changes to the validation requirements are immediately stored in the database.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Figure 1:
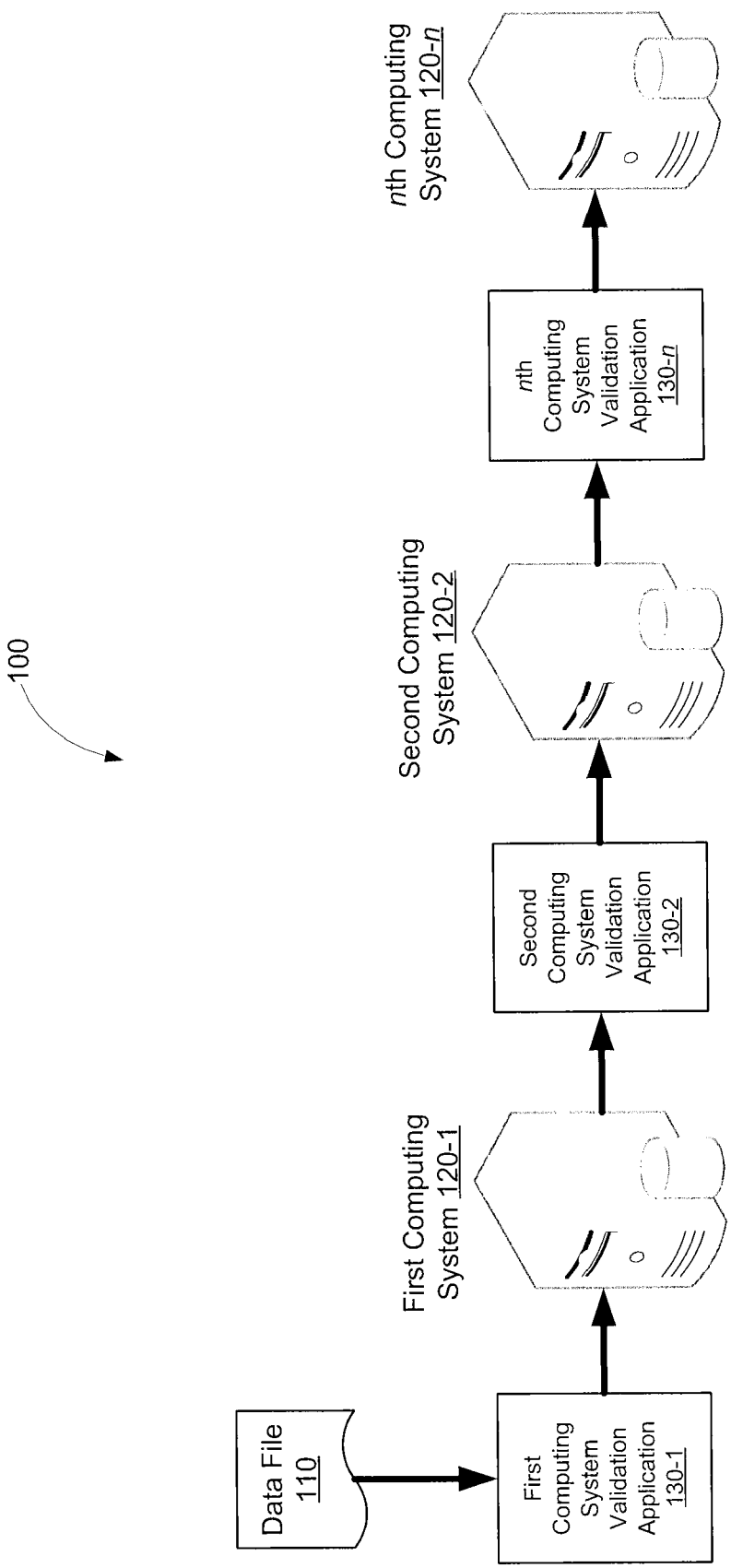
Figure 2:
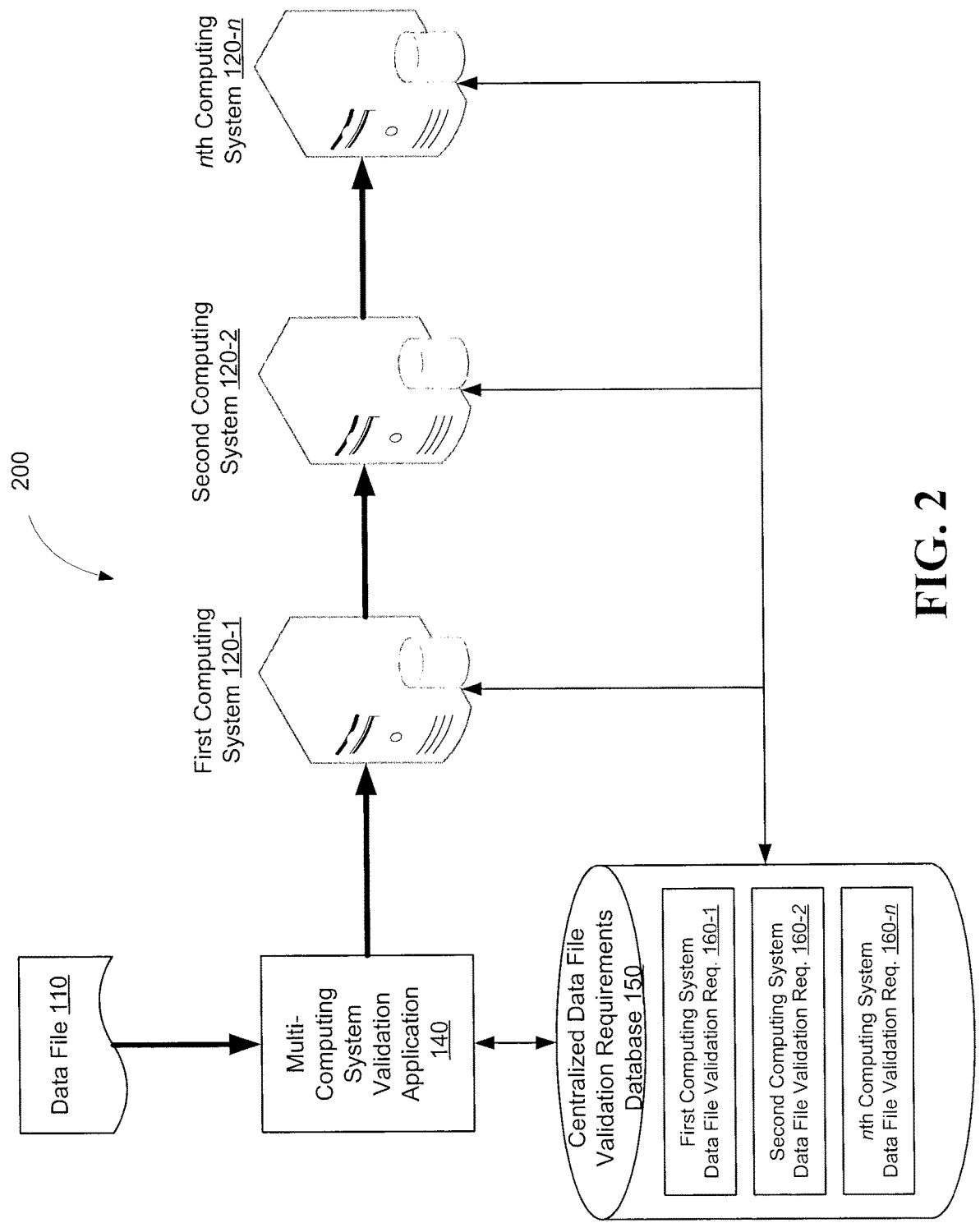
Figure 3:
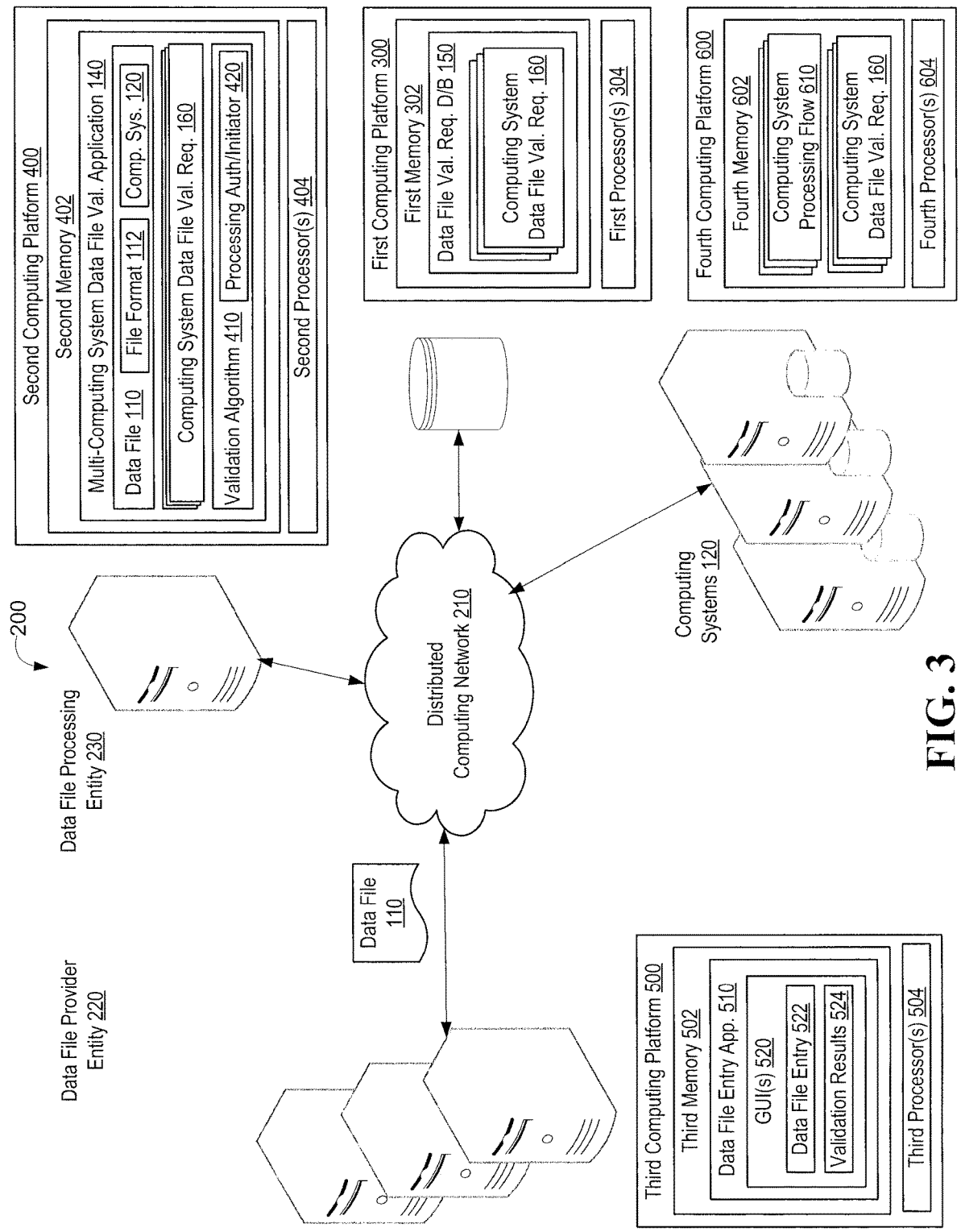
Figure 4:
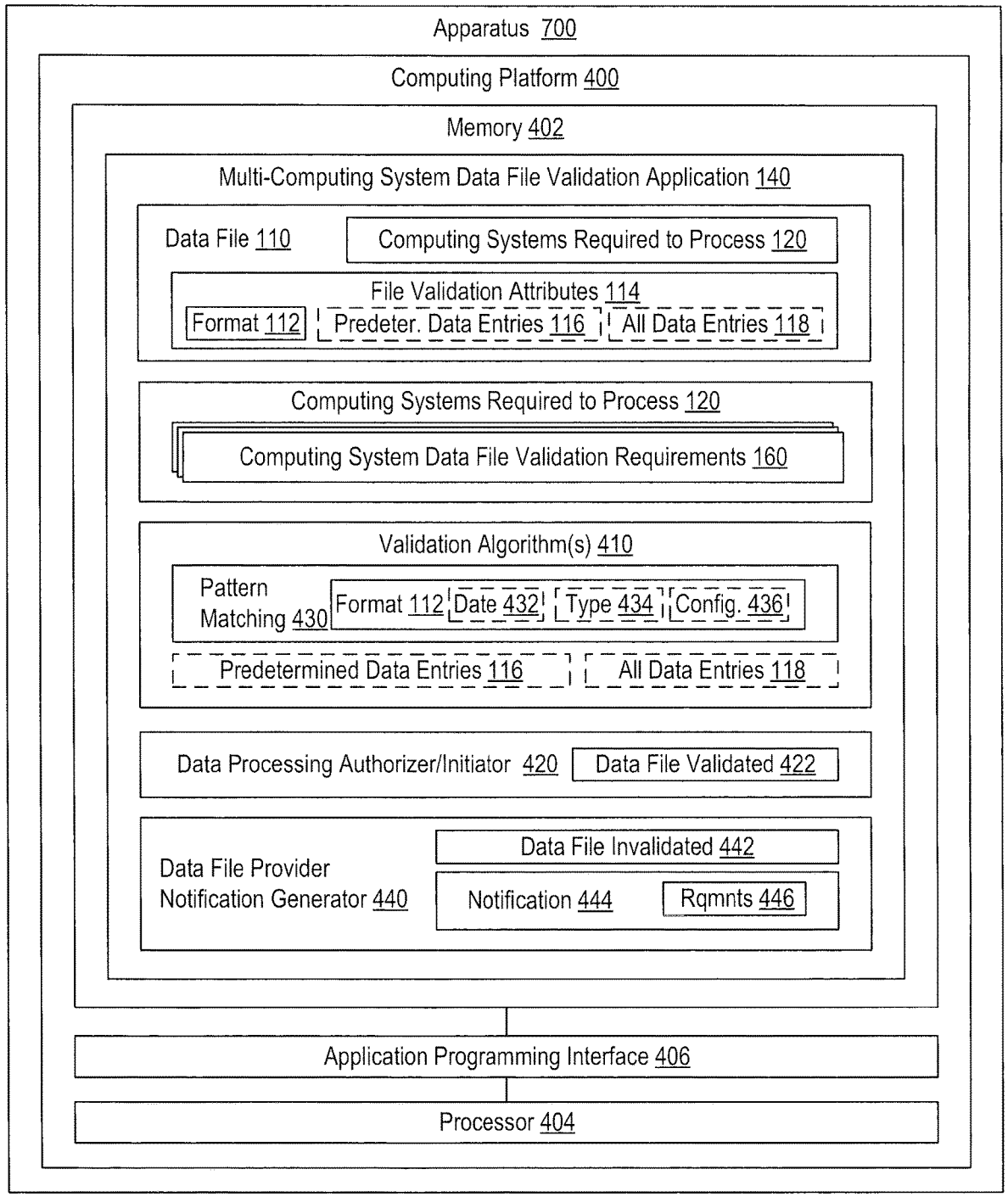
Figure 5:
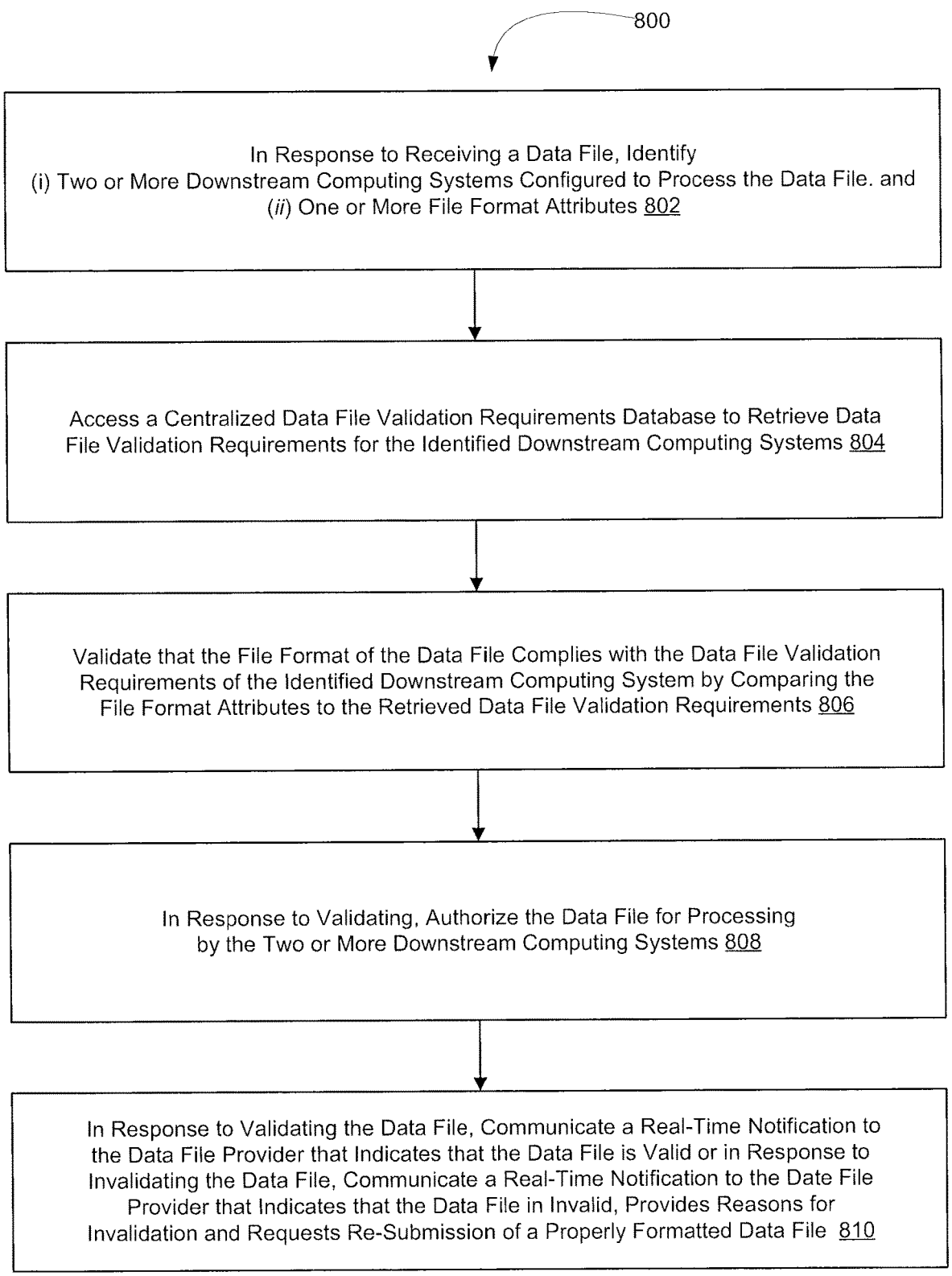

Having thus described embodiments of the invention in general terms, reference will now be made the accompanying drawings, wherein:

FIG. 1 provides a block diagram of a system for validating a data file in a multi-computing system processing flow, in accordance with the prior art;

FIG. 2 provides a block diagram of a system for front-end comprehensive validating of a data file requiring multi-computing system processing, in accordance with embodiments of the present invention;

FIG. 3 provides a more detailed schematic diagram of a system for front-end comprehensive validating of a data file requiring multi-computing system processing, in accordance with embodiments of the invention;

FIG. 4 provide block diagram of an apparatus configured for front-end comprehensive validating of a data file requiring multi-computing system processing, in accordance with embodiments of the invention; and FIG. 5 provides a flow diagram of a method for front-end comprehensive validating of a data file requiring multi-computing system processing, in accordance with embodiments of the invention.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to like elements throughout.

As will be appreciated by one of skill in the art in view of this disclosure, the present invention may be embodied as an apparatus (e.g., a system, computer program product, and/or other device), a method, or a combination of the foregoing. Accordingly, embodiments of the present invention may take the form of an entirely hardware embodiment, an entirely software embodiment (including firmware, resident software, micro-code, etc.), or an embodiment combining software and hardware aspects that may generally be referred to herein as a "system." Furthermore, embodiments of the present invention may take the form of a computer program product comprising a computer-usable storage medium having computer-usable program code/computer-readable instructions embodied in the medium.

Any suitable computer-usable or computer-readable medium may be utilized. The computer usable or computer-readable medium may be, for example but not limited to, an electronic, magnetic, optical, electromagnetic, infrared, or semiconductor system, apparatus, or device. More specific examples (e.g., a non-exhaustive list) of the computer-readable medium would include the following: an electrical connection having one or more wires; a tangible medium such as a portable computer diskette, a hard disk, a time-dependent access memory (RAM), a read-only memory (ROM), an erasable programmable read-only memory (EPROM or Flash memory), a compact disc read-only memory (CD-ROM), or other tangible optical or magnetic storage device.

Computer program code/computer-readable instructions for carrying out operations of embodiments of the present invention may be written in an object oriented, scripted or unscripted programming language such as JAVA, PERL, SMALLTALK, C++, PYTHON or the like. However, the computer program code/computer-readable instructions for carrying out operations of the invention may also be written in conventional procedural programming languages, such as the "C" programming language or similar programming languages.

Embodiments of the present invention are described below with reference to flowchart illustrations and/or block diagrams of methods or apparatuses (the term "apparatus" including systems and computer program products). It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a particular machine, such that the instructions, which execute by the processor of the computer or other programmable data processing apparatus, create mechanisms for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instructions, which implement the function/act specified in the flowchart and/or block diagram block or blocks.

The computer program instructions may also be loaded onto a computer or other programmable data processing apparatus to cause a series of operational events to be performed on the computer or other programmable apparatus to produce a computer implemented process such that the instructions, which execute on the computer or other programmable apparatus, provide events for implementing the functions/acts specified in the flowchart and/or block diagram block or blocks. Alternatively, computer program implemented events or acts may be combined with operator or human implemented events or acts in order to carry out an embodiment of the invention.

As the phrase is used herein, a processor may be "configured to" perform a certain function in a variety of ways, including, for example, by having one or more general-purpose circuits perform the function by executing particular computer-executable program code embodied in computer-readable medium, and/or by having one or more application-specific circuits perform the function.

Thus, according to embodiments of the invention, which will be described in more detail below, systems, apparatus, methods and computer program products are disclosed for front-end all-encompassing validation of data files that subsequently are processed by multiple different computing systems having different validation requirements. In this regard, the validation for all of the multiple different computing systems is performed upon receipt of the data file. This means that once the data file has been determined to be valid (e.g., meets formatting requirements, data entry requirements or the like for all the computing systems), a real-time notification is communicated to the originator/sender of the data file indicating such and the data file is authorized to be processed and is more likely to undergo straight-through processing, since the data file has been found to meet all of the validation requirements for all of the ensuing computing systems. Moreover, in the event that validation results in an error/failure, the originator/sender of the data file can be notified of the error failure proximate in time to when completion of the validation process (i.e., shortly after submitting the data file) and the originator/sender can correct the issue and re-submit a valid data file shortly after being notified of the error/failure.

In specific embodiments of the invention, validation includes verifying the correctness of file format (e.g., file naming convention, file type, file configuration/structure and the like). While in other embodiments, validation may include determining that valid data entries exist in mandatory data fields (i.e., mandatory data that is required for processing the data by the computing systems) or, in other embodiments, all of the data entries in the data file may be validated.

In addition, the present invention is able to insure that the validation meets the current requirements of all the ensuing computing systems. In this regard, the present invention employs a centralized data file validation requirements database that stores validation requirements for each of the computing systems. The database is in active communication with the computing systems, such that, changes to the computing systems that result in changes to the validation requirements may be immediately stored in the database. Further, each time a data file is validated the centralized data file validation requirements database is accessed to retrieve the validation requirements for the applicable computing systems.

Referring to FIG. 1 a block/flow diagram is presented of a system 100 for convention data file validation, in accordance with the prior art. In conventional system 100 a data file 110 is received that requires processing, in sequence, by multiple different computing systems 120-1, 120-2 and 120-n. Each of the computing systems 120-2, 120-2 and 120-n have a corresponding validation application 130-1, 130-2, 130-n having specific validation requirements for the corresponding computing system 120-2, 120-2 and 120-n. The data file 110 will initially undergo validation by first computing system validation application 130-1 and, if the validation is successful, the data file 110 is processed by first computing system 120-1. Upon completion of processing by the first computing system 120-1, the data file 110 undergoes validation by second computing system validation application 130-2 and, if the validation is successful, the data file 110 is processed by second computing system 120-2 and so on. It should be noted that while the validation and computing system data processing operations are shown to occur in sequence in other instances one or more of the validation operations and/or data processing operations may occur in parallel.

However, in the event that any one of the validation processes results in an error/failure, further processing of the data file 110 is stopped and the entity which transmitted the data file 110 may be notified of the error/failure and required to re-submit a valid data file. From the data processing entity perspective, such occurrence of a validation error/failure downstream in the overall data file processing flow is costly, time-consuming and inefficient. In specific instances the re-submitted data file may have to undergo processing by computing systems, which the previous data file already had undergone. From the data file originator/sender perspective, any downstream validation error/failure that requires resubmission of a valid data file invariably leads to a costly delay in the completion of the processing of the data file. The present invention serves to overcome the problems associated with the conventional data file validation system 100 shown in FIG. 1.

Referring to FIG. 2 a block/flow diagram is presented of a system 200 for front-end comprehensive data file validation for a data file requiring processing by multiple computing systems, in accordance with the present invention. The system includes a centralized data file validation requirements database 150 that stores validation requirements for each computing system within the processing entity. For the example shown in FIG. 2, in which data file 100 requires data processing by first computing system 120-1, second computing system 120-2 and nth computing system 120-n, database 150 stores corresponding first computing system validation requirements 160-1, second computing system validation requirements 160-2 and nth computing system validation requirements 160-n. It should be noted that, in specific embodiments of the invention, the database 150 is in active communication with the computing systems 120-1, 120-2, 120-n, such that, changes/revisions to the computing systems 120-1, 120-2, 120-n, that affect the validation requirements can responsively result in updates to the corresponding validation requirements 160-1, 160-2, 160-n stored in the database 150. By insuring the currency of the validation requirements stored in the database, the present invention insures that the front-end validation process is accurate for all downstream computing systems that subsequently process the data file 110.

The system 200 additionally includes multi-computing system validation application 140 that is configured to perform front-end comprehensive data file validation for all of the downstream computing systems that are required to process any data file. Application 140 is configured to receive data file 110 (which may be transmitted by an external entity, such as customer, vendor or the like) prior to the data file 110 being processed by any the downstream computing systems 120-1, 120-2, 120-n. Upon receipt, application 140 is configured to identify (i) the downstream computing systems 120-1, 120-2, 120-n that the data file requires processing by, and, at least (ii) file format attributes (e.g., file naming convention, file type, file structure/configuration or the like). Once the downstream computing systems 120-1, 120-2, 120-n have been identified, the application accesses the centralized data file validation requirements database 150 to retrieve the applicable validation requirements 160-1, 160-2 and 160-n associated with the identified downstream computing systems 120-1, 120-2, 120-n. It should be noted that while the computing systems are depicted being sequential in practice one or more of the computing system data processing operations may occur in parallel.

Application 140 is further configured to validate that the file format of the data file 110 complies with the validation requirements 160-1, 160-2 and 160-n of the downstream computing systems 120-1, 120-2, 120-n by comparing the file format attributes to the validation requirements 160-1, 160-2 and 160-n. In response to validating the data file 110, application 140 is configured to authorize the data file 110 for processing by the downstream computing systems 120-1, 120-2, 120-n and, in some embodiments, communicate a notification to the data file provider that indicates that the data file has been validated. Thus, the present invention serves to provide validation for all computing systems within a processing flow, at the front-end (i.e., upon receipt of the data file as transmitted by a sender/originator entity) and, thus, insures that the data file 110 is acceptable/valid for all subsequent processing at the onset of the processing flow. As will be discussed infra., in the event that a failure/error occurs during the validation, specific embodiments of the invention, provide for the sender/originator entity to be notified in real-time (i.e., proximate in time to submitting the data file and completing the validation process), such that the sender/originator entity can address the reason for file (e.g., re-format the data file 110 or the like) and, in due course, re-submit a valid data file 110. In specific instances, the sender/originator entity is able to re-submit a valid data file 110 during the same session in which they submitting the original invalid data file 110.

Referring to FIG. 3 a more detailed schematic diagram is presented of the system 200 for front-end comprehensive data file validation for a data file requiring processing by multiple computing systems, in accordance with the present invention. The system 200 is implemented in a distributed computing network 210, which may include both public (e.g., Internet) and private (intranet) networks. In specific embodiments of the invention, in which the data file provider entity 220 is external from the data processing entity 230 (such as an external customer, vendor, third-party entity or the like) the data file provider entity 220 may be provided access to the data processing entity's 230 internal computing network (e.g., intranet) for uploading/transmitting the data file 110, such as via a secured tunnel connection or the like. In other embodiments of the invention, the data file 110 may be transmitted from the data file provider entity 220 to the data processing entity 230 via the Internet. In other specific embodiments of the data processing entity 230 may be the same entity that provides the data file (i.e., the data file originates and/or is transmitted by an internal entity within the data processing entity 230).

The system 300 includes a first computing platform 300 disposed in the distributed computing network 210 and including a first memory 302 and one or more first processor(s)/processing devices 304 in communication with the first memory 302. The first computing platform 300 may comprise one or more computing devices, such one or more database servers or the like and thus first memory 302 and first processors 304 may be disposed amongst multiple computing devices. The first memory 302 of computing platform 304 stores data file validation requirements database 150 which is configured to store computing system data file validation requirements 160 for a plurality of computing systems 120 implemented by the data processing entity 230 in processing data files 110. In specific embodiments of the invention, the plurality of computing systems 120 may comprise all or most of the computing systems 120 implemented by the data processing entity 230 in processing data files 110.

The system additionally includes second computing platform 400 disposed in the distributed computing network 210 and including a second memory 402 and one or more first processor(s)/processing devices 404 in communication with the second memory 402. The second computing platform 400 may comprise one or more computing devices, such one or more servers or the like and thus second memory 402 and second processors 404 may be disposed amongst multiple computing devices. Second memory 402 of second computing platform 400 stores multi-computing system data file validation application 150 that is configured perform front-end comprehensive validation of data files 110 for all of the downstream computing systems 120 that process the data file 110.

Application 140 is configured to receive data file 110 transmitted/uploaded from data file provider entity 220, which, as previously noted, may be a vendor, customer, third-party entity or the like. In response to receiving the data file 110, the application 140 is configured to identify (i) the downstream computing systems 120 that the data file requires processing by, and, at least (ii) file format attributes 112 (e.g., file naming convention, file type, file structure/configuration or the like). In specific embodiments of the invention, the downstream computing systems 120 are pre-determined based on the overall processing flow (e.g., the transmission/upload means, receipt means and the like). In other embodiments of the invention, the downstream computing systems 120 may be dynamically determined at the time of receipt based on attributes associated with the data file 110, the data file provider entity 230, the data file processing entity 230 and the like. For example, such attributes may include, but are not limited to, processing timing requirements, cost of processing, quality of processing and the like. File format attributes 112 may be identified from the name of the file, which provides for file naming convention, date format, file type and the like and scanning of the file to identify file configuration (e.g., rows/columns formatting and the like).

Application 140 is further configured to access the centralized data file validation requirements database 150, via the distributed computing network 210, to retrieve the applicable validation requirements 160 associated with the identified downstream computing systems 120.

The application 150 further includes one or more validation algorithms 410 that are configured to validate that the file format of the data file 110 complies with the validation requirements 160 of the downstream computing systems 120 by comparing the file format attributes 112 to the validation requirements 160. In specific embodiments of the invention, as will be discussed in more detail in relation to FIG. 4, the validation algorithms 410 implement pattern matching techniques to determine if the file format meets the validation requirements of multiple different computing systems 120. In response to validating the data file 110, application 140 implements processing authorization/initiator 420 to authorize and initiate processing of the data file 110 by the downstream computing systems.

The system 200 additionally includes third computing platform 500 disposed in the distributed computing network 210 and including a third memory 502 and one or more third processor(s)/processing devices 504 in communication with the third memory 502. The third computing platform 500 may comprise a plurality of computing devices, such one or more PCs, mobile computing devices or the like and thus third memory 502 and third processors 504 may be disposed amongst multiple computing devices. The third memory 502 of computing platform 500 stores data file entry application 510 that is configured to provide a user one or more graphical user interfaces (GUIs) 520 for inputting a data file entry 522 (i.e., requesting and initiating transmission of a data file 110 to the data file processing entity 230. Since the data file entry application 510 will be implemented on different platforms (e.g., mobile, personal computer and the like) the application 510 and GUIs may vary depending on the platform. The application 510 is in communication with data file validation application 150 to allow for secure transmission/upload of data files to the data processing entity 230. In addition, the integration of the data file entry application 510 and the validation application 150 provides for validation results to be communicated to the data file provider entity 220 in real-time or near-real-time of completion of the validation process. In this regard, the GUIs 510 are configured to provide the user immediate notification that a data file has successfully been validated or, in the event that errors/failure occur in the validation process, notification that a data file has been found to be invalid. Such notification may be presented to the user during the session in which the user transmitted/uploaded the data file (e.g., a short period of time after transmitting/uploading the data file). In the event that the notification in response to data file having been found to be invalid, the notification may include the reasons for invalidation, including proper formatting requirements/validation criteria and a request to re-submit the data file in the proper format or including requisite validation criteria.

Further embodiments of the system 200 include a fourth computing platform 600 disposed in the distributed computing network 210 and including a fourth memory 602 and one or more fourth processor(s)/processing devices 604 in communication with the fourth memory 602. The fourth computing platform 600 includes a plurality of computing devices, such a plurality of servers of the like and thus fourth memory 602 and fourth processors 604 are disposed amongst multiple computing devices. The fourth memory 602 of fourth computing platform 600 stores computing system processing flow 610, which include the algorithms, modules, mechanisms and the like for processing the data file through the associated computing system 120. In specific instances in which the computing system 120 is not in communication with validation requirements database 150 (or the data base is down), the validation application 150 may, at the time of performing a data file validation, access the computing system 120 directly to retrieve the computing system data file validation requirements 160. In other embodiments of the invention, the system 200 may implement a back-up database 150 which is accessed in the event the primary database 150 is down or otherwise inaccessible.

Referring to FIG. 4 a block diagram is presented of an apparatus 700 configured for front-end comprehensive validation of data files requiring processing by multiple downstream computing systems, in accordance with embodiments of the present invention. The apparatus 700 includes a computing platform 400 that can execute algorithms, such as modules, routines, applications and the like. Computing platform 400 includes memory 402, which may comprise volatile and non-volatile memory, such as read-only and/or random-access memory (RAM and ROM), EPROM, EEPROM, flash cards, or any memory common to computer platforms). Moreover, memory 402 may comprise cloud storage, such as provided by a cloud storage service and/or a cloud connection service.

Further, computing platform 400 also includes processor 404, which may be an application-specific integrated circuit ("ASIC"), or other chipset, logic circuit, or other data processing device. Processor 404 may execute one or more application programming interface (APIs) 406 that interfaces with any resident programs, such as multi-computing system data file validation application 140 or the like stored in the memory 404 of the computing platform 400 and any external programs, such as data file validation requirements database 150 and data file entry application 510 (shown in FIG. 3). As such the APIs provide for real-time communication with the database 150 for the purpose of retrieving validation requirements 160 and real-time communication with data entry application 510 for the purpose notifying the data file provider entity 220 of validation results 524.

Processor 404 may include various processing subsystems (not shown in FIG. 4) embodied in hardware, firmware, software, and combinations thereof, that enable the functionality of apparatus 700 and the operability of the apparatus 700 on a network. For example, processing subsystems allow for initiating and maintaining communications and exchanging data with other networked devices. For the disclosed aspects, processing subsystems of processor 404 may include any subsystem used in conjunction with validation application 140 and related sub-routines, algorithms, sub-algorithms, modules, sub-modules thereof.

Computer platform 400 may additionally include a communications module (not shown in FIG. 4) embodied in hardware, firmware, software, and combinations thereof, that enables electronic communications between the apparatus 700 and other network devices, such as those shown in FIG. 3. Thus, communication module may include the requisite hardware, firmware, software and/or combinations thereof for establishing and maintaining a network communication connection.

Memory 402 of computing platform 400 stores multi-computing system data file validation application 150 that is configured to provide front-end comprehensive validation of data files requiring data processing by multiple downstream computing systems, in accordance with embodiments of the present invention. In response to receiving the data file 110 from the data file provider entity 220, the application 140 is configured to identify (i) the downstream computing systems and (ii) file validation attributes 114. It should be noted that the file validation attributes may be identified in response to receiving the data file 110 or after the date file validation requirements 160 for the applicable computing systems 120 are retrieved. The file validation attributes 114 may include, but are not limited to, file format attributes 112, such as file name, file type, file configuration or the like, predetermined data entries 116 and/or all data entries 118. Predetermined data entries 116 may be further defined as those data entries that mandatory for performing the data processing by the downstream computing systems 120. In those embodiments in which the contents of the data file are associated with the file validation attributes 114, the file may be scanned in order to determine attributes, such as, data entries or file configuration. As previously discussed, the downstream computing systems 120 required to process the data file may be identified based on the configuration of the overall system or, in certain embodiments, may be identified dynamically at the time of data file receipt based processing criteria associated with the data file, the data file provider and/or the data file processing entity.

Validation application 140 is further configured to access database 150 to retrieve computing system data file validation requirements 160 for the applicable downstream computing systems 120. The validation requirements 160 are retrieved from the database 150 on a per-validation process basis to insure that the validation requirements 160 used for the validation are the current up-to-date validation requirements 160. In alternate embodiments of the invention, in which the validation requirements 160 for an applicable computing system 120 are not currently stored in the database 150 (or in instances in which the database is currently down), the application 140 is configured to directly communicate with the computing systems 120 to retrieve the applicable validation requirements 160. In other embodiments of the invention, in which a database 150 is determined to be down/inaccessible, the application 140 is configured to communicate with a back-up database 150 to retrieve the applicable validation requirements 160.

In addition, validation application 140 includes one or more validation algorithms 410 that are configured to validate that the data file complies with the computing system data file requirements 160 by comparing one or more of the file validation attributes 114 to the validation requirements 160. In specific embodiments of the invention, the algorithms 410 may comprise one or more pattern matching algorithms 430. In such embodiments, the pattern matching algorithms may be used to validate file format attributes 112, such as, but not limited to, date/name format 432, data file type 434 and data file configuration/layout 436. In specific embodiments of the invention, pattern matching algorithms 430 may provide for comparing file validation attributes 114 that are common to all of the computing system validation requirements 160 first, followed by comparison of file validation attributes 114 that are the same for two or more computing system validation requirements 120 and, lastly, comparing the file validation requirements 114 that are unique to only one of the computing system validation requirements 120. In addition to file format validation, in specific embodiments of the invention validation may further include predetermined/mandatory data entries 116 or all/most of the data entries 118. Validation of data entries may include, but is not limited to, verifying the existence of the data entry in an associated data field, verifying the correct syntax of data entries, verifying the correct format of the data entries.

Validation application 140 further includes data processing authorization/initiator 420. Once the data file has been successfully validated 422, the data processing authorization/initiator 420 communicates the data file 110 to one or more of the computing systems 120 or otherwise authorizes the one or more computing systems to begin the data processing operations.

Further, validation application 140 includes a data file provider notification generator and communicator 440 that is configured to generate and initiate communication of notifications to the data file provider in response to completing the validation process. The notification 444 may indicate that the data file 110 has been successfully validated 422 or the notification may indicate that errors/failures occurred in the validation resulting in the data file 110 being invalid 442. In those embodiments in which the data file 110 is invalid 442, the notification 44 may include the validation requirements 446 resulting in error/failure (e.g., file format and indication of proper file format) and, if necessary, a request for resubmission 448 of the date file 110 in proper format and/or including requisite data entries. In specific embodiments of the invention, in which an API 406 provides for the validation application 140 to interface with the data file entry application 510 (shown in FIG. 3), the notifications 444 may be delivered in real-time or near-real time to completion of the validation process. In this regard, the data file provider can be notified of a valid data file or an invalid data file shortly after transmitting/uploading the data file 110 to the data file processing entity 230. In the event that data file is found to be invalid, such immediate notification allows for the data file provider to address the reason for data file invalidation (e.g., re-format the data file, include requisite data entries or the like) and re-submit the data file 110 during the same user session, in which the user submitting the original/invalid data file 110.

Referring to FIG. 5 a flow diagram is depicted of a high-level method 800 for front-end comprehensive validation of data files requiring processing by multiple downstream computing systems, in accordance with embodiments of the present invention. At Event 802. In response to receiving a data file, (i) the downstream computing systems configured to process the data file, and (ii) the file format attributes are identified. In specific embodiments of the invention, the downstream computing systems are predetermined based on the overall system for submitting and processing the data files. In other embodiments of the invention, the downstream computing systems may be dynamically determined at the time of receipt based on processing criteria and attributes associated with the data file, the data file provider entity and/or the data file processing entity. In specific embodiments the processing attributes may include, but are not to, time for processing, location of processing, cost of processing, quality of service or processing, required accuracy of processing, required security of processing and the like. The file format attributes may include, but are not limited to, file name, file data format, file type, file configuration/layout and the like. In additional embodiments of the invention, in which validation includes data entry validation, predetermined data entries or all/most of the data entries are identified by scanning the data file. The file format attributes or any other validation attributes may be identified in response to receipt of the data file or, in other embodiments, file format attributes or any other validation attributes may be identified after retrieval of the validation requirements.

At Event 804, the centralized data file validation requirements database is accessed to retrieve the data file validation requirements for the downstream computing systems. The validation requirements are retrieved from the database on a per-validation basis to insure that the validation requirements are current. In the event that the database does not currently store validation requirements for an applicable computing system (or the database is currently down), the computing systems are accessed to retrieve the data file validation requirements directly from the computing system. In other embodiments of the invention, a second back-up database may be implemented and accessed in the event that the primary database is down/inaccessible.

At Event 806, at a minimum, the file format is validated by comparing the file format attributes to the retrieved data file validation requirements. As previously discussed, in specific embodiments of the invention, pattern matching algorithms are implemented to compare the file format attributes of the data file to the validation requirements. In other embodiments of the invention, other data file attributes are verified including, but not limited to, predetermined/mandatory data entries, all/most data entries or the like.

At Event 808, in response to validating the data file, authorization is presented to one or more of the downstream computing systems to initiate the data processing. In specific embodiments of the invention, the authorization may include communicating the data file to the one or more downstream computing systems. At Event 810, in response to determining that the data file is valid, a notification/alert is generated and communicated to the data file provider, in real-time or near-real time to completing the validation process, which serves to notify the data file provider that the data file has been validated and that data processing by the computing systems has begun or will begin. In response to determining that the data file is invalid, a notification/alert is generated and communicated to the data file provider, in real-time or near-real time to completing the validation process, which serves to notify the data file provider that the data file is invalid and provides the reasons for invalidation (i.e., formatting issues that require correction, data entries that require inclusion or the like) and, if applicable, requests that the data file provider resubmit the data file in proper format.

Thus, as described above, embodiments of the present invention provide for front-end comprehensive validation of data files that require processing by multiple different computing systems having different validation requirements. Validation for all of the multiple different computing systems is performed upon receipt of the data file by the data processing entity and, as such, in the event that validation results in an error/failure, the originator/sender of the data file can be notified of the error failure proximate in time to when the data file is transmitted to the data processing entity and can re-submit a valid data file in due time. In addition, the present invention is configured to insure that the validation meets the current requirements of all the computing systems that process the data file by employing a centralized data file validation requirements database that stores validation requirements for each of the computing systems. The database is in active communication with the computing systems, such that, changes to the computing systems that result in changes to the validation requirements are immediately stored in the database.

As the phrase is used herein, a processor may be "configured to" perform a certain function in a variety of ways, including, for example, by having one or more general-purpose circuits perform the function by executing particular computer-executable program code embodied in computer-readable medium, and/or by having one or more application-specific circuits perform the function.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other changes, combinations, omissions, modifications and substitutions, in addition to those set forth in the above paragraphs, are possible.

Those skilled in the art may appreciate that various adaptations and modifications of the just described embodiments can be configured without departing from the scope and spirit of the invention. Therefore, it is to be understood that, within the scope of the appended claims, the invention may be practiced other than as specifically described herein.

The invention claimed is:

1. A system for front-end validation of a data file requiring processing by a plurality of downstream computing systems, the system comprising:

a first front-end computing platform disposed in a distributed computing network and including a first memory and at least one first processor in communication with the memory;

a centralized data file validation requirements database stored in the first memory, accessible by the at least one first processor and configured to store one or more data file validation requirements for each of the plurality of downstream computing systems;

a second front-end computing platform disposed in the distributed computing network and including a second memory and at least one second processor in communication with the memory; and a data file validation application stored in the second memory, executable by the at least one second processor and configured to:

in response to receiving the data file:
  a) identify (i) two or more of the plurality of downstream computing systems that will process the data file, and (ii) one or more file format attributes of the data file, and
  (b) scan the data file to identify data entries in predetermined mandatory data fields required performing processing by the two or more of the plurality of downstream computing systems;

access the centralized data file validation requirements database to retrieve data file validation requirements for the two or more of the plurality of downstream computing systems;

validate that
  (i) the one or more file format attributes of the data file are compliant with the retrieved data file validation requirements of the two or more of the plurality of downstream computing systems by performing pattern matching of the one or more file format attributes to the retrieved data file validation requirements, and
  (ii) a syntax and format of the data entries in the predetermined mandatory data fields are compliant with the data file validation requirements of the two or more of the plurality of downstream computing systems by verifying that common file format attributes associated with the two or more of the plurality of downstream computing systems match the syntax and format of the data entries; and in response to the validating, authorize the data file for processing by the two or more of the plurality of downstream computing systems.

2. The system of claim 1, wherein the centralized data file validation requirements database is in active communication with the plurality of downstream computing systems, such that changes made to one of the plurality downstream computing systems that affect formatting, are reflected in a real-time update to a corresponding one of the one or more data file validation requirements stored in the centralized data file validation requirements database.

3. The system of claim 1, wherein the data file validation application is further configured to:

validate that the one or more file format attributes of the data file are compliant with the retrieved data file validation requirements of the two or more of the plurality of downstream computing systems by, in response to the verifying that the common file format attributes do match the retrieved data file validation requirements, verifying one or more unique format attributes for at least one of the two or more of the plurality of downstream computing systems match the retrieved data file validation requirements.

4. The system of claim 1, further comprising:

a third front-end computing platform disposed in a distributed computing network and including a third memory and at least one third processor in communication with the memory; and a plurality of data file entry applications stored in the third memory, executable by the third processor and configured to provide user interfaces for inputting the data file and initiating communication of the data file to the data file validation application.

5. The system of claim 4, wherein the data file validation application is further configured to:

in response to the validating the one or more file format attributes of the data file, communicate, via one of the data file entry applications used to initiate communication of the data file, a first real-time notification that is configured to indicate that the data file has been validated and that data processing by the two or more of the plurality of downstream computing systems is ensuing; and in response to failing to validate the one or more file format attributes of the data file based on non-compliance with the retrieved data file validation requirements of the two or more of the plurality of downstream computing systems, communicate, via one of the data file entry applications used to initiate communication of the data file, a real-time notification that is configured to indicate expected formatting requirements and a need to re-submit the data file that meets the expected formatting requirements.

6. A computer-implemented method for front-end validation of a data file requiring processing by a plurality of downstream computing systems, the method executed by a computing device processor and comprising:

in response to receiving the data file:
  a) identifying, by at least one front-end computing platform, (i) two or more of the plurality of downstream computing systems that will process the data file, and (ii) one or more file format attributes of the data file, and
  (b) scanning, by the at least one front-end computing platform, the data file to identify data entries in predetermined mandatory data fields required for performing processing by the two or more of the plurality of downstream computing systems;

accessing, by the at least one front-end computing platform, a centralized data file validation requirements database to retrieve data file validation requirements for the two or more of the plurality of downstream computing systems;

validating, by the at least one front-end computing platform, that
  (i) the one or more file format attributes of the data file being compliant with the retrieved data file validation requirements of the two or more of the plurality of downstream computing systems by performing pattern matching of the one or more file format attributes to the retrieved data file validation requirements, and
  (ii) a syntax and format of the data entries in the predetermined mandatory data fields are compliant with the data file validation requirements of the two or more of the plurality of downstream computing systems by verifying that common file format attributes associated with the two or more of the plurality of downstream computing systems match the syntax and format of the data entries; and in response to the validating, authorizing, by the at least one front-end computing platform, the data file for processing by the two or more of the plurality of downstream computing systems.

7. The computer-implemented method of claim 6, wherein validating further comprises:

in response to the verifying, by the at least one front-end computing platform, that the common format attributes do match the retrieved data file validation requirements, verifying one or more unique format attributes for at least one of the two or more of the plurality of downstream computing systems match the data file.

8. The computer-implemented method of claim 6, further comprising one of:

in response to the validating the one or more file format attributes of the data file, communicating, by the at least one front-end computing platform via one of the data file entry applications used to initiate communication of the data file, a first real-time notification that is configured to indicate that the data file has been validated and that data processing by the two or more of the plurality of downstream computing systems is ensuing; and in response to failing to validate the one or more file format attributes of the data file based on non-compliance with the retrieved data file validation requirements of the two or more of the plurality of downstream computing systems, communicating, by the at least one front-end computing platform via one of the data file entry applications used to initiate communication of the data file, a real-time notification that is configured to indicate expected formatting requirements and a need to re-submit the data file that meets the expected formatting requirements.

9. A computer program product including a non-transitory computer-readable medium, the computer-readable medium comprising:

a first set of codes for causing a computer of at least one front-end computing platform to, in response to receiving a data file:

a) identify (i) two or more of tho a plurality of downstream computing systems that will process the data file, and (ii) one or more file format attributes of the data file, and b) scan the data file to identify data entries in predetermined mandatory data fields required performing processing by the two or more of the plurality of downstream computing systems;

a second set of codes for causing the computer to access a centralized data file validation requirements database to retrieve file validation requirements for the two or more of the plurality of downstream computing systems;

a third set of codes for causing the computer to validate that (i) the one or more file format attributes of the data file are compliant with the retrieved data file validation requirements of the two or more of the plurality of downstream computing systems by performing pattern matching of the one or more file format attributes to the retrieved data file validation requirements, and (ii) a syntax and format of the data entries in the predetermined mandatory data fields are compliant with the data file validation requirements of the two or more of the plurality of downstream computing systems by verifying that common file format attributes associated with the two or more of the plurality of downstream computing systems match the syntax and format of the data entries; and a fourth set of codes for causing the computer to, in response to the validating, authorize the data file for processing by the two or more of the plurality of downstream computing systems.

10. The computer program product of claim 9, wherein the third set of codes is further configured to cause the computer to:

in response to the verifying that the common format attributes do match the retrieved data file validation requirements, verify one or more unique format attributes for at least one of the two or more of the plurality of downstream computing systems match the data file.

11. The computer program product of claim 9, further comprising:

a fifth set of codes for causing a computer to (i) in response to failing to validate the one or more file format attributes of the data file based on non-compliance with the retrieved data file validation requirements of the two or more of the plurality of downstream computing systems, communicate, via one of the data file entry applications used to initiate communication of the data file, a real-time notification that is configured to indicate expected formatting requirements and a need to re-submit the data file that meets the expected formatting requirements, and (ii) in response to the validating the one or more file format attributes of the data file, communicate, via one of the data file entry applications used to initiate communication of the data file, a first real-time notification that is configured to indicate that the data file has been validated and that data processing by the two or more of the plurality of downstream computing systems is ensuing.

* * * * *